(12) United States Patent
Voelkl et al.

(10) Patent No.: US 9,458,045 B2
(45) Date of Patent: Oct. 4, 2016

(54) METHOD AND APPARATUS FOR THE SEALING OF GLASS TUBES IN A HOT SOFTENED STATE

(71) Applicant: SCHOTT AG, Mainz (DE)

(72) Inventors: Franz Voelkl, Friedenfels (DE); Albert Schmid, Mitterteich (DE); Thomas Schirmel, Toestau (DE); Heinz-Josef Henke, Mitterteich (DE); Carsten Haman, Konnersreuth (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/671,526

(22) Filed: Mar. 27, 2015

(65) Prior Publication Data
US 2015/0197443 A1 Jul. 16, 2015

Related U.S. Application Data

(63) Continuation of application No. PCT/EP2013/067640, filed on Aug. 26, 2013.

(51) Int. Cl.
*C03B 23/11* (2006.01)
*C03B 23/18* (2006.01)
*C03B 23/09* (2006.01)

(52) U.S. Cl.
CPC .......... *C03B 23/118* (2013.01); *C03B 23/099* (2013.01); *C03B 23/18* (2013.01)

(58) Field of Classification Search
CPC ... C03B 23/099; C03B 23/118; C03B 23/18; C03B 35/26
See application file for complete search history.

(56) References Cited

U.S. PATENT DOCUMENTS

| 2,633,672 | A | * | 4/1953 | Ralston | C03B 23/18 65/280 |
| 3,170,782 | A | * | 2/1965 | Koenig | C03B 23/118 414/757 |
| 3,215,517 | A | | 11/1965 | Zimmermann | |
| 4,096,683 | A | * | 6/1978 | McMickle, Jr. | B65B 3/003 141/49 |
| 4,385,919 | A | * | 5/1983 | Goffredi | C03B 23/095 65/109 |

(Continued)

FOREIGN PATENT DOCUMENTS

| DE | 865642 C | 2/1953 |
| DE | 1114992 B | 10/1961 |

(Continued)

OTHER PUBLICATIONS

Office Action of the German Patent Office dated May 21, 2013 for corresponding German Patent Application No. 10 2012 109 189.7 with English translation, 10 pages.

(Continued)

*Primary Examiner* — Jodi C Franklin
(74) *Attorney, Agent, or Firm* — Ohlandt, Greeley, Ruggiero & Perle, LLP

(57) ABSTRACT

A method for the sealing of glass tubes in a hot softened state is provided. The method includes softening the glass at a severing zone adjacent to an end portion of the glass tube and rotating the glass tube about its longitudinal axis while being heated until a hot softened state is reached in which the end portion is severed off. The hot softened end portion of the glass tube can be pulled-off from the severing zone by a pulling-off device in such a way that the glass tube is simultaneously heat sealed at the severing zone during the severing process.

6 Claims, 5 Drawing Sheets

(56) References Cited

U.S. PATENT DOCUMENTS

| | | | | |
|---|---|---|---|---|
| 4,596,681 | A | * 6/1986 | Grossman | C03B 23/057 |
| | | | | 264/297.9 |
| 5,902,368 | A | 5/1999 | Witzmann et al. | |
| 6,363,750 | B1 | * 4/2002 | Chiodo | C03B 23/045 |
| | | | | 422/562 |
| 2007/0214836 | A1 | * 9/2007 | Piegendorfer | C03B 35/26 |
| | | | | 65/102 |
| 2010/0122557 | A1 | 5/2010 | Piegendorfer et al. | |

FOREIGN PATENT DOCUMENTS

| | | | |
|---|---|---|---|
| DE | 1127042 | B | 4/1962 |
| DE | 1173210 | A | 7/1964 |
| DE | 1906934 | A1 * 9/1970 | ............. C03B 23/18 |
| DE | 4444547 | A1 | 6/1996 |
| DE | 19908342 | C1 | 6/2000 |
| DE | 102004019544 | B3 | 10/2005 |
| DE | 102005038764 | B3 | 10/2006 |
| EP | 1834931 | A2 | 9/2007 |
| GB | 174049 | A | 12/1921 |
| GB | 528031 | A * 10/1940 | ........... C03B 23/097 |
| GB | 920056 | A | 3/1963 |

OTHER PUBLICATIONS

English translation of International Search Report dated Nov. 14, 2013 for corresponding PCT/EP2013/067640, 2 pages.

Decision to Grant of the German Patent Office dated Dec. 5, 2013 for corresponding German Patent Application No. 10 2012 109 189.7 with English translation and including allowe claims in German and English, 12 pages.

English translation of the Written Opinion of the International Searching Authority dated Nov. 14, 2013 for corresponding PCT/EP2013/067640, 5 pages.

English translation of the International Preliminary Report on Patentability dated Mar. 31, 2015 for corresponding PCT/EP2013/067640, 6 pages.

* cited by examiner

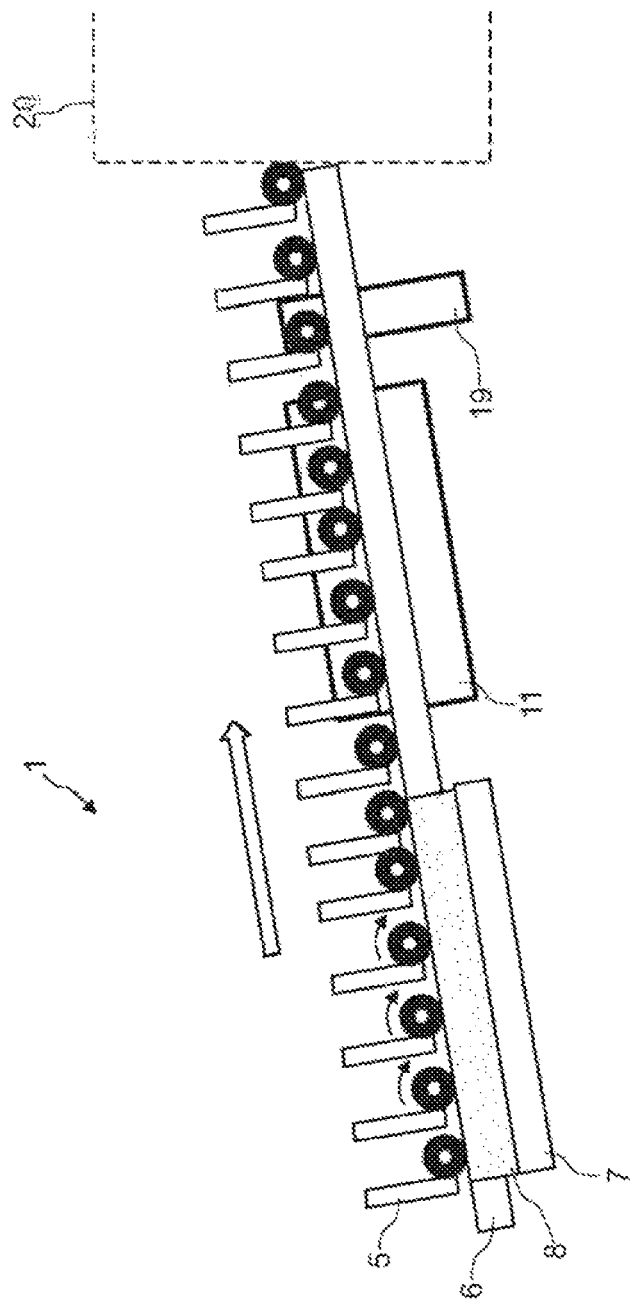

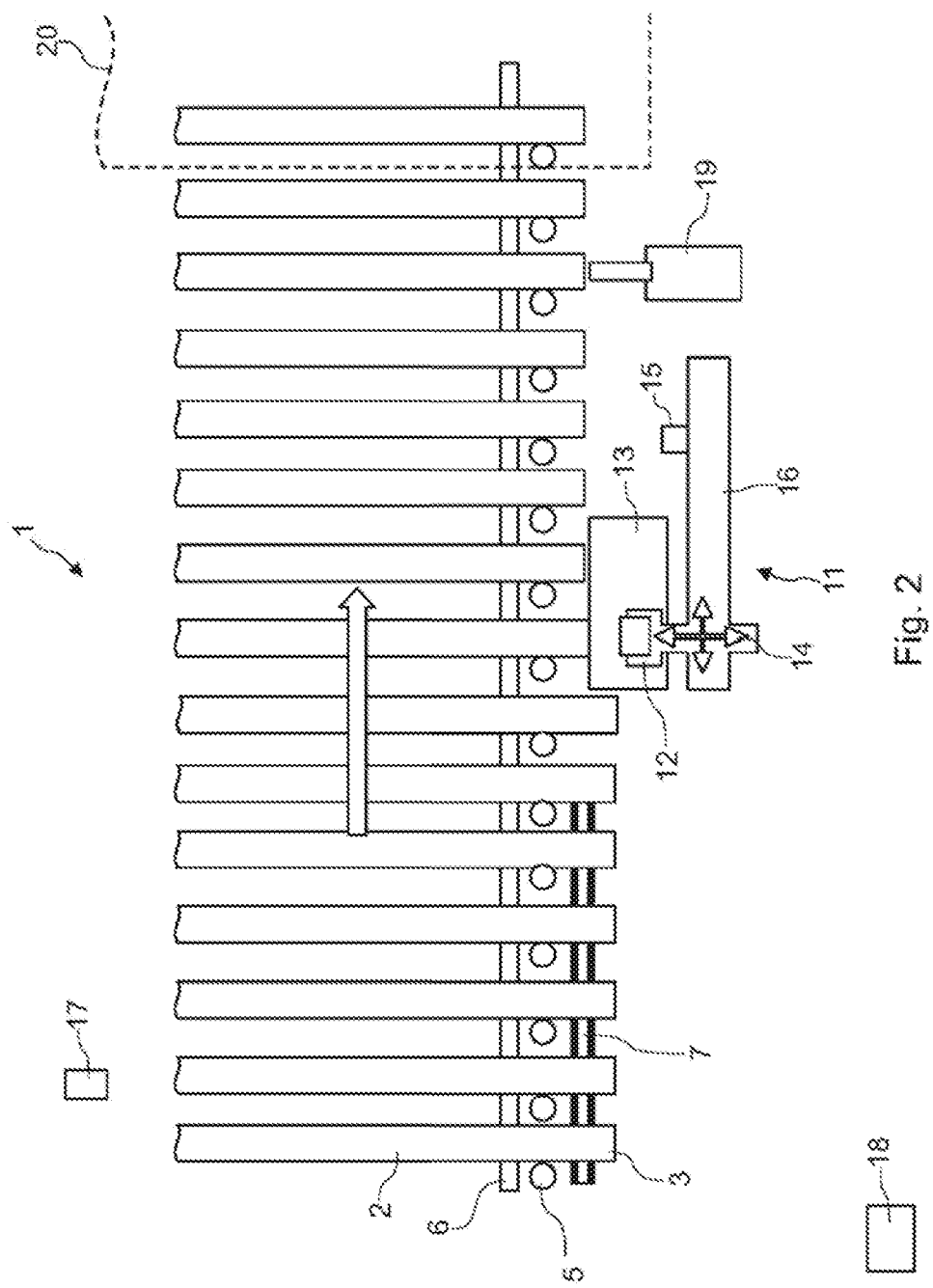

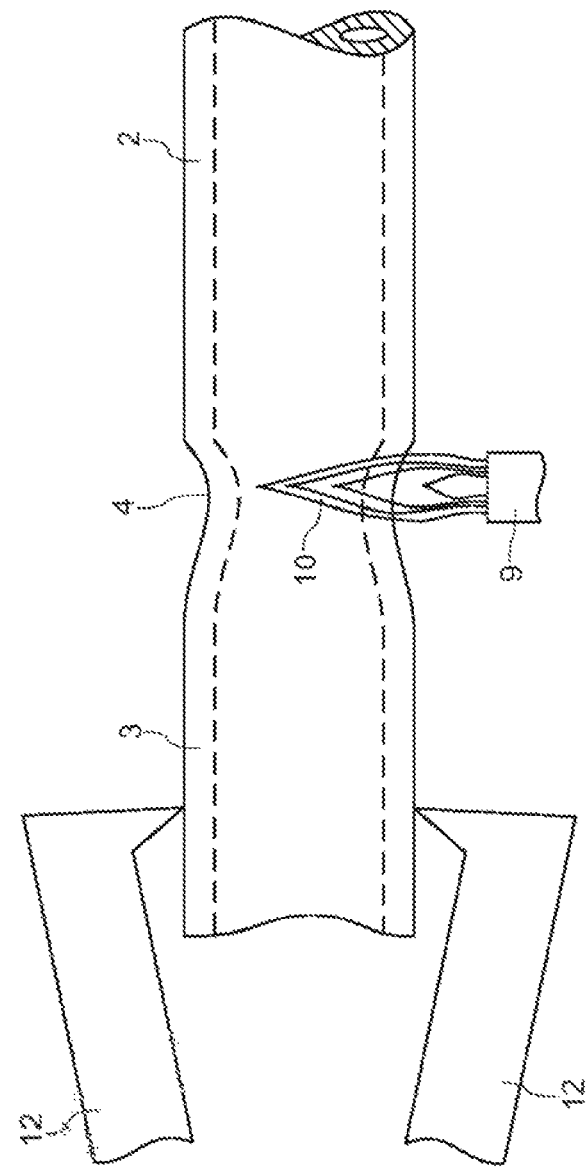

METHOD AND APPARATUS FOR THE SEALING OF GLASS TUBES IN A HOT SOFTENED STATE

CROSS REFERENCE TO RELATED APPLICATIONS

The present application is a continuation of International Application No. PCT/EP2013/067640 filed on 26 Aug. 2013, which claims the priority of German patent application DE 10 2012 109 189 filed on 27 Sep. 2012, the entire contents of both of which are hereby expressly incorporated by way of reference for disclosure purposes.

BACKGROUND

1. Field of the Invention

The present invention relates to a method and an apparatus for the sealing of glass tubes in a hot softened state, especially of glass tubes, which are intended for the production of primary packaging means made of glass for the storage of pharmaceutically active substances.

2. Description of Related Art

In the production of glass tubes usually glass tubes are severed from the glass tube line (glass tubing), which are then processed further. These glass tubes may have standard lengths of e.g. 1.5 m, but may also be severed off to relatively short glass tubes of a few centimeters in length in order to be processed directly to primary packaging means for the storage of pharmaceutical substances, for example, glass ampoules, glass vials or glass syringes. Particularly for the latter applications, it is indispensable that no impurities reach the interior of the glass tubes in the course of processing and handling, as these can be removed from it again only with considerable effort.

Therefore, the tube ends are severed off in a hot softened state directly at the glass tubing in a special tube end processing machine and the tubes are sealed therewith to prevent a deposition of particles inside the glass tube.

In the known methods, the tubes are usually processed individually on rotating rollers, and the glass tube is separated by heating an annular zone and subsequently moving apart of the roller units.

GB 174049 A discloses a device, in which the glass tube is rotated continuously about the longitudinal axis by pairs of rollers. A burner, which is arranged near the peripheral edge of the glass tube, heats the rotating glass tube until it is sufficiently softened. In the hot softened state of the glass tube the pairs of rollers are pulled apart along the longitudinal axis of the glass tube to sever the glass tube. Thereby the edges are fused to a flat bottom at the end portions of the glass tube so as to seal the end of the glass tube. The contact pressure which is necessary for enabling the pairs of rollers to rotate the glass tube evenly, however, causes a risk for cracks and scratches. The contact surfaces are therefore potential sources for contamination and abrasion.

According to DE 1114992 A, the glass tubes are grasped by holding means and conveyed along a vertical conveying path by means of a vertical conveying device and thereby heated by means of a plurality of annular softening burners. Rotating tongs grip the softened end portions of the glass tube and are pulled apart. The severing of the end portions in a hot softened state is further assisted by means of side-mounted obstacles, such as knives. However, due to the conveyance in the vertical direction, breaking tubes or pieces thereof fall down on subsequent glass tubes, which can lead to breakage or damage to the glass tubes.

DE 1127042 A discloses a further method, in which the glass tube is put in a uniform rotary movement by means of several pairs of rollers which engage the respective end of the glass tube. A gas flame softens the severing zone, while the glass tube is rotated. An additional obliquely-positioned roller pulls the respective end portion axially from the glass tube. At the same time the gas flame fuses the end portion to a flat bottom. Due to tolerances of the glass tube, fluctuating friction conditions and sliding effects, however, ambiguous and fluctuating movements or even wobbling movements may occur and thus varying results at the sealed end of the tube may occur. Since the glass tubes are processed, clocked relatively little time remains for processing.

DE 19908342 C1 discloses a further method, in which a screw, which is mounted coaxially to the glass tube, is rotated synchronously to the conveying movement of the glass tube in such way, that the peripheral edge of the screw reaches the outer surface of the glass tube at a certain point of engagement and is wandering around the glass tube in an axially perpendicular plane to sever off the glass tube. The end of the glass tube is, however, not pulled off.

EP 1834931 A2 discloses a method for melting the ends of glass tubes. For this purpose, a longer glass tube is first cut into relatively short glass tubes, which are then deposited on a gripping chain. In doing so, the ends of the tubes are freely accessible from the side. The glass tubes are guided via a lifting rail and lifted thereby. During the subsequent rolling on the lifting rail the glass tubes are caused to rotate, while the end of the glass tube is fused by a gas flame. A sealing of the end of the glass tube is not disclosed.

U.S. Pat. No. 2,633,672 A discloses a method for the sealing of glass tubes in a hot softened state for the production of vials, in which these are moved along a conveying path and put in a uniform rotation about their longitudinal axis by moving rubber bands. Thereby the axis of rotation of the vials is stabilized by means of a cylinder. The rotating vials are moved along a strip of burners and heated and softened evenly around their circumference. At the same time the neck portion softens, which is pulled off axially by a rotating finger having a U-shaped hook, so that the end portion is fused and the vial is sealed by a plug. To put the glass tubes in a uniform rotation, a considerable effort is required. The sealing of the end of the glass tubes by means of a simple plug is unsuitable for many applications.

SUMMARY OF THE INVENTION

It is an object of the present invention to provide an enhanced method for the sealing of glass tubes in a hot softened state, by means of which the glass tubes can be sealed at lower costs and in a more uniform and very flexible manner. Furthermore, a corresponding apparatus is to be provided.

These problems are solved by a method and apparatus as disclosed herein.

In a method for the sealing of glass tubes in a hot softened state according to the present invention, the glass tube is softened at a severing zone near an end portion of the glass tube and the glass tube is rotated about its longitudinal axis and thereby heated until a hot softened state is reached in which the end portion can be readily severed off.

According to the present invention the hot softened end portion of the glass tube is pulled off from the severing zone by means of a pulling device, which is preferably rotationally fixed, but which may also rotate at an angular speed that is different to the angular speed of the glass tube according to an alternative embodiment, so that at the same time the glass tube is sealed at the severing zone by fusion during the severing process. By rotating the tube on the conveying path simple, linear softening burners below the tubes can be used instead of annular burners. Superimposing the rotational movement of the tube with the stationary fixed end portion (or alternatively, with the rotating end portion rotating at a different angular speed) causes a more uniform necking of the end portion and thus a more homogeneous sealing. In particular, the processing parameters during necking and fusion of the ends of the glass tubes can be adjusted flexibly and in a simple manner according to the present invention.

In a method according to the present invention the glass tube is conveyed along a conveying path and along the pulling device at a predetermined speed transverse to the longitudinal axis. This conveying path, in particular with belt chain conveying devices, may be formed basically linearly and preferably revolving, however, may in principle also be designed circular or elliptical in cross-section, for example in the form of a conveying carousel. The glass tubes are preferably conveyed continuously and precisely in synchronism with the upstream glass tube drawing system. In general, however, the glass tubes may also be conveyed clocked. The glass tubes are preferably conveyed at a constant speed at least in the heating zone and in the downstream severing zone. For this purpose, a precise speed control or speed regulation is provided.

On the conveying path the glass tubes are thereby put into a rotation, which is uniform and constant at least in the heating zone and in the downstream separation zone, so that constant and reproducible processing conditions prevail there.

Generally, the glass tubes can be put into a rotation by means of pairs of rollers, which are moved along the conveying path, as described above. According to a preferred embodiment, the glass tube, however, is put into a rotation about the longitudinal axis by rolling on at least one stationary supporting strip and thus conveyed in a forward rolling movement transverse to the longitudinal axis along the pulling device. All contact points between the supporting strip and the conveying device (such as a conveyor belt or contact pins or contact webs) and the glass tube are coated for this purpose with a low friction, high temperature resistant material or formed from this, especially from Teflon or graphite, to avoid abrasion, scratches and inhomogeneities on the peripheral wall of the glass tubes. In this case the glass tubes are preferably pushed or pulled along the conveying path by pushing means of the conveying device that contact the glass tube only locally at relatively short sections. These pushing means may be, for example, vertical contact pins or contact webs, so that the major part of the glass tube is not resting on the conveying path.

According to a further embodiment, the supporting strip is inclined obliquely upwards, for example, at an angle of 3° to 25°, so that the resulting downhill-slope force pushes the glass tubes always reliably but with little force against the pushing means of the conveying device. The angle of inclination of the supporting strip and of the conveying path may also be adjustable, even during an ongoing production.

According to a further embodiment, the pulling device is moved transverse to the longitudinal axis in correspondence to the movement of the glass tube, while the end portion is pulled off from the severing zone. For this purpose at least one drive is assigned to the pulling device, for example, an electric motor or linear motor. Preferably, the movement of the pulling device is carried out in the severing zone and along the conveying path exactly in synchronism with the conveying movement of the glass tubes. Thus, overall the drives define a pulling-off trajectory of the pulling device corresponding to the movement of the glass tube transverse to the longitudinal axis. In this way, a predetermined relative position of the pulling device relative to the rotating tube end can always be defined in the severing zone. Preferably, the pulling device is supported precisely centered to the respective end of the tube to affect a symmetrical sealing of the respective tube end.

According to a further embodiment, the pulling-off trajectory of the pulling device may selectively deviate also from the movement of the glass tubes in the severing zone, in particular by a minor amount. With this deviation of the trajectories of the end of the glass tube and of the pulling device, which may also be time-dependent and not constant, according to the present invention a further parameter is available to define the processing conditions during the severing and sealing of the tube ends.

According to a further embodiment, the pulling-off trajectory is controlled by means of a controlling device, such as a microprocessor, as a function of the diameter and/or of the movement of the glass tube in the direction of the longitudinal axis and/or transverse to the longitudinal axis and/or of the type of the glass tube to be sealed. Thus, the processing conditions during the severing and sealing in a hot softened state may be varied and controlled further.

According to a further embodiment, the diameter and/or the movement of the glass tube transverse to the longitudinal axis and/or the type of the glass tube to be sealed is detected by a sensor and the controlling device controls the pulling-off trajectory based on the detected diameter and/or on the detected movement of the glass tube transverse to the longitudinal axis and/or on the detected type of the glass tube to be sealed. Thus, the processing conditions during the severing and sealing in a hot softened state can be varied and controlled more accurately and individually in correspondence to the respective glass tube.

According to a further embodiment the shape of a sealed end portion of the glass tube near the severing zone is affected by means of a blowing nozzle disposed downstream of the pulling device. Thus, in particular a curvature of the bottom at the sealed end of the tube can be affected easily.

According to a further preferred embodiment, the rotation of the end portion of the glass tube, i.e. of the tube end, is stopped by the pulling device, in particular by a gripping device, or its rotation about its longitudinal axis is reduced significantly or at least stopped almost completely while the glass tube continues to rotate about its longitudinal axis. Thereby, according to the present invention the glass tube is necked in the softened region at the severing zone to a larger extent than in conventional methods. Because of the smaller residual cross section in the softened zone before the severance in conjunction with a controlled pulling-off trajectory of the pulling device, according to the present invention the tube end collapses after the separation in a considerably more controlled manner. At the same time, because of the significantly better necking according to the present invention the transition region from the solid zone to the softened zone is already suitably preformed so that at this position a more uniform curvature occurs, which has a positive effect on the uniformity of the formation of the bottom and thus affects the stability of the severed glass tube in the region of the bottom. In particular, thus heat sealed end portions can be obtained according to the present invention having a nearly flat bottom.

An apparatus for the sealing of glass tubes in a hot softened state comprises a heating device for softening an end portion of the glass tube, a conveying device for conveying the glass tube transverse to the longitudinal axis of the glass tube along the heating device, and a pulling device for pulling off an end portion of the glass tube softened by the heating device.

According to the present invention the conveying device is configured in such a way, to rotate the glass tube about its longitudinal axis, while being conveyed along the heating device, wherein the pulling device is rotationally fixed or rotates at an angular speed which is different to the angular speed of the glass tube, for pulling off the softened end portions from the glass tube such that the glass tube is sealed by fusion at the severing zone.

According to a further embodiment, the conveying device comprises a plurality of contact pins, which contact the glass tube in sections, for pushing the glass tube along the heating device, and at least one stationary supporting strip on which the moving glass tube is supported and put into a rotation about the longitudinal axis by rolling on the supporting strip to be conveyed transverse to the longitudinal axis along the pulling device in a rolling forward movement, wherein the supporting strip is preferably inclined obliquely upward.

According to a further embodiment, at least one drive is assigned to the pulling device for moving the pulling device transverse to the longitudinal direction in correspondence to the movement of the glass tube while the end portion is pulled off from the severing zone, wherein the respective drive is controlled by a controlling device such that the pulling device is displaced along a pulling-off trajectory corresponding to the movement of the glass tube transverse to the longitudinal axis.

According to a further embodiment, the processor controls the pulling-off trajectory as a function of the diameter and/or of the movement of the glass tube transverse to the longitudinal axis and/or of the type of the glass tube to be sealed. Thus, on the one hand an exactly centered positioning and relative position of the pulling device relative to the tube end can be ensured also for different tube diameters. On the other hand, also the type and/or the subsequent use of the glass tube to be sealed can affect the controlling of the pulling-off trajectory. For example, for obtaining a very flat bottom of the glass tube to be sealed, the pulling device may be guided exactly in synchronism with the movement of the glass tube in the severing zone, while a slight deviation of the pulling-off trajectory may be used to move the glass tube e.g. for the formation of slightly curved ends of the glass tube to be sealed.

According to a further embodiment, a sensor is also provided for detecting the diameter and/or the movement of the glass tube transverse to the longitudinal axis and/or the type of the glass tube to be sealed, so that the processor controls the pulling-off trajectory based on the detected diameter and/or on the detected movement of the glass tube transverse to the longitudinal axis and/or on the detected type of the glass tube to be sealed. The controlling may in particular be controlled based on a lookup table or control function that may be stored in the controlling device.

BRIEF DESCRIPTION OF THE DRAWINGS

The invention will be described by way of example and with reference to the accompanying drawings, from which further advantages, features and objects to be achieved will arise. In the drawings:

FIG. 1 is a schematic side view of an apparatus for the sealing of glass tubes in a hot softened state according to the present invention.

FIG. 2 shows the apparatus according to FIG. 1 in a schematic plan view;

FIG. 3a is an enlarged view of a severing zone for an explanation of the severing of a hot softened end portion and the sealing of the glass tube with the method according to the present invention;

In the drawings, like reference numerals designate identical or substantially equivalent elements or groups of elements.

DETAILED DESCRIPTION

Figure 3B:
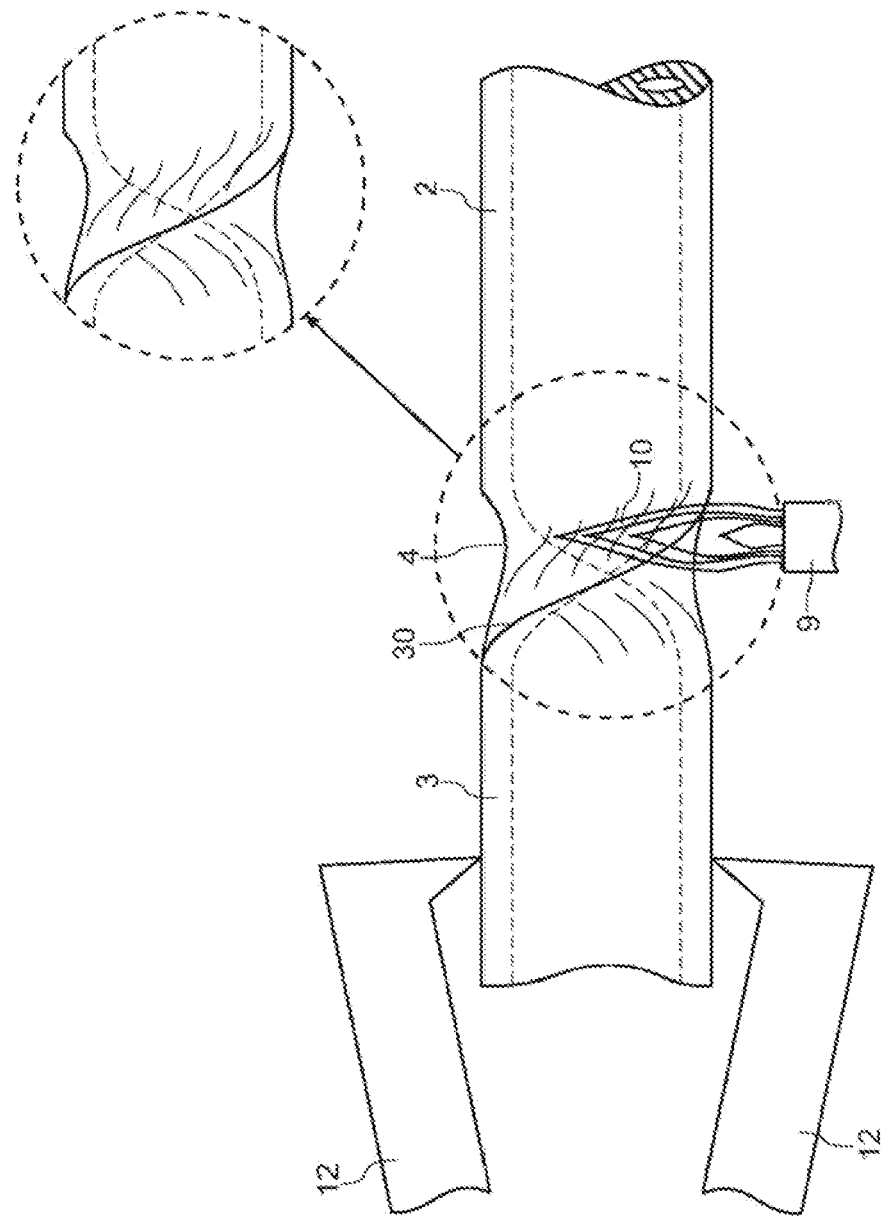
FIG. 3b is an enlarged view of a severing zone for an explanation of the severing of a hot softened end portion and the sealing the glass tube according to a further embodiment of the present invention.

According to FIGS. 1 and 2 glass tubes 2 are suitably severed from a glass tube line, for example, in lengths of 1.5 m, and are put on a conveying path which is divided by vertical pins 5 into regular segments, in each of which a glass tube 2 is accommodated. The contact pins 5 are moved continuously in the direction of the arrow by means of a conveying belt (not shown), namely at a velocity, which is matched and synchronized to the velocity of the incoming glass tube line (not shown) of the glass tube production system.

The glass tubes 2 are thus only contacted locally at the contact pins 5, namely in the vicinity of the end portions 3 to be melted. At the opposite ends of the glass tubes, an additional row of contact pins 5 is provided (not shown) so that the glass tubes 2 are placed symmetrically in the receptacles formed by the contact pins 5. The major part of the peripheral walls of the glass tube 2 is not supported. As shown in FIG. 1, the glass tubes 2 rest on a stationary supporting strip 6 close to the end portions 3, which extends at an angle of about 3° to 25° obliquely upwards. Because of the downhill-slope force due to the slope of the conveying path the glass tubes 2 rest well defined on the downstream contact pin 5. Since the glass tubes 2 are pushed by the contact pins 5 simultaneously, the glass tubes 2 are put into a uniform rolling forward movement, as indicated by the rotational arrows in FIG. 1, wherein the angular speed is determined in a known manner by the conveying velocity and the outer radius of the glass tube 2.

To prevent scratches and abrasion on the glass tubes, the contact materials (contact pins 5, supporting strips 6) that contact the tubes typically consist of materials having low coefficients of friction, low abrasion and leave no traces on the glass tube 2 and which are sufficiently heat resistant, e.g. of plastics such as teflon or of graphite.

In this way, the glass tubes 2 are conveyed with a uniform rolling forward movement through a heating zone 8, which is e.g. formed by a strip of burners 7 consisting of a number of evenly spaced individual burners. In the heating zone 8 the end portions 3 are heated, until they can be severed and sealed in a hot softened state, as explained in detail below.

Finally, the glass tubes 2 are conveyed in a uniform rolling forward movement along a pulling device 11, which has a single gripper 12, which is configured to pull off the end portions 3 axially, i.e. along the longitudinal axis of the glass tubes 2 (y-direction). Suitably, the gripper 12 is formed by two gripping tongs for this purpose, as schematically shown in FIG. 3a, so that the apparatus can be adjusted quickly to other tube diameters.

Drive motors 14, 15 are associated with the pulling device 11, preferably linear electric motors, which move the gripper 12 in correspondence to the forward movement of the glass tubes 2, when the gripper 12 keeps on gripping the end portion 3 to be severed. For this purpose, on the one hand a movement of the pulling device 11 in parallel with the forward movement of the glass tubes 2 (the x-direction) is required, and for pulling-off the end portion 3 in the direction of the longitudinal axis of the glass tubes 2 (y-direction), thus in two mutually perpendicular directions. Since the forward movement of the glass tubes 2 on the supporting strip 6 takes place obliquely upwards, due to the support by the supporting strip, for this purpose the pulling device is driven in such way that the x-direction is exactly in parallel with the forward movement of the glass tubes 2, thus also directed obliquely upward, as schematically indicated in FIG. 2 by reference numeral 16. For pulling off the hot softened end portion 3 in axial direction, the drive 14 is provided for moving the gripper 12 along the longitudinal axis of the glass tubes 2.

For reasons of simplification, in FIGS. 1 and 2 it is shown that the severing zone, in which the pulling device 11 severs the end portions 3, is downstream of the heating zone 8. Generally, however, both zones may overlap partially or completely.

Below the severing zone there is a collecting tray 13 for collecting the separated end portions 3, so that there is no risk of contaminating subsequent tubes there. Downstream of the severing zone a blower nozzle 19 is disposed by means of which the shape of a sealed end portion of the glass tube 2 can be affected near the severing zone. As indicated by the dashed line 20, a cooling furnace is provided further downstream of the severing zone, through which the glass tubes 2 run for reducing internal tensions. The entire tube end processing apparatus 1 or portions thereof, e.g. the heating zone 8 or the severing zone, may be shielded by a housing or cover against ambient effects.

In the following, the process of severing the end portions 3 and sealing the glass tubes is described in more detail with reference to FIGS. 3a and 3b. When rolling in a forward movement, the glass tubes 2 pass over one or more strips of burners 7. In this case, a defined annular region of the glass tube is heated uniformly by the very narrow flame, so that eventually a necking 4 is formed.

In the hot softened state the tubular end portion 3 is now grasped by the gripper 12. According to the present invention, the gripper 12 is preferably either rotationally fixed (see FIG. 3b) or it rotates at an angular speed, which is different to the angular speed of the glass tube (see FIG. 3a). Suitably, the difference in the angular speeds is as large as possible; the gripper is almost rotationally fixed (non-rotating).

Since the glass tube 2 is moved further rolling past the gripper 12, eventually a twisting of the necking zone 4 occurs. This twisting in the necking zone 4 is indicated in FIG. 3b by reference numeral 30 and the opposite crosshatching in the vicinity of line 30. It should be noted that FIG. 3b is considered to be based on a method, in which the gripper 12 is rotationally fixed, so that the end portion 3 held by the gripper 12 does not continue to rotate, while the glass tube 2 continues to rotate about its longitudinal axis, resulting in the twisting of the glass tube along line 30.

Upon further pulling off the hot softened end portion 3 in the direction of the longitudinal axis of the glass tube 2 the twisted necking zone 4 finally breaks off and the hot softened wall portions of the glass tube 2 fold back to eventually fall into mutual contact and fuse together. This effect is further supported by the uniform rolling movement of the glass tubes 2, so that according to the present invention a uniform bottom is formed at the end of the glass tube 2. The shape of this bottom can be affected further by the temperature conditions in the severing zone, by the angular speed of the glass tube and by the ambient conditions, in particular also by the blowing nozzle 19 downstream of the severing zone, as shown in FIG. 1, which further supports the aforesaid folding back of the hot softened wall portions of the glass tube 2, after separation of the end portion 3 in order to accelerate or further assist the sealing of the glass tube 2 after the actual separation process and to suitably affect the shape of the bottom of the still hot softened bottom of the glass tube 2, which is in the process of being formed.

In order that the necking zone 4 collapses uniformly after the separation of the end portion 3 and forms a uniform bottom, according to the present invention the gripper 12 is moved during the severing of the hot softened end portion 3 in the direction of the longitudinal axis along a pulling-off trajectory corresponding to the movement of the glass tube 2.

Preferably, the movement of the gripper 12 in the x-direction is exactly synchronized to the movement of the glass tube 2 in the severing zone, thus in the example of FIG. 1 horizontally and vertically, i.e. obliquely upward (in the x-direction). Furthermore, the pulling movement of the gripper 12 in the y-direction is exactly in parallel with the longitudinal axis of the glass tube 2 (in y-direction). Therefore, a detailed knowledge of the tube diameter of the glass tube 2 is required. This may be input into a controlling device 18, such as a microprocessor, which controls the pulling device 11, or may be stored there. With the knowledge of the tube diameter the gripper 12 may also always be positioned and guided exactly centered with respect to the glass tube 12.

In the apparatus according to the present invention the end of the tube end is preferably stopped by the gripper 12 (no rotation), while the tube continues to rotate, as shown in FIG. 3b. As a result, the tube is necked to a larger extent in the softened zone. Because of the smaller residual cross section in the softened zone before the severing in conjunction with the controlled pulling-off trajectory of the gripper 12 the end of the tube collapses considerably more controlled after the severing. At the same time the transition region from the solid zone to the softened zone is already preformed due to the significantly better necking so that at this point a more uniform rounding occurs, which has a positive effect on the uniformity of the bottom formation and thus on the stability of the tube in the region of the bottom.

According to a preferred embodiment, important parameters of the movement of the glass tube 2, in particular its tube diameter and its movement along the pulling device 11, can be detected by means of one or more sensors 17 (see FIG. 2), for example by means of optical sensors, by means of a camera with image processing software or by means of a laser. The detected measurement data are input to the controlling device 18 for controlling the pulling-off trajectory of the pulling device 11.

Figure 4:
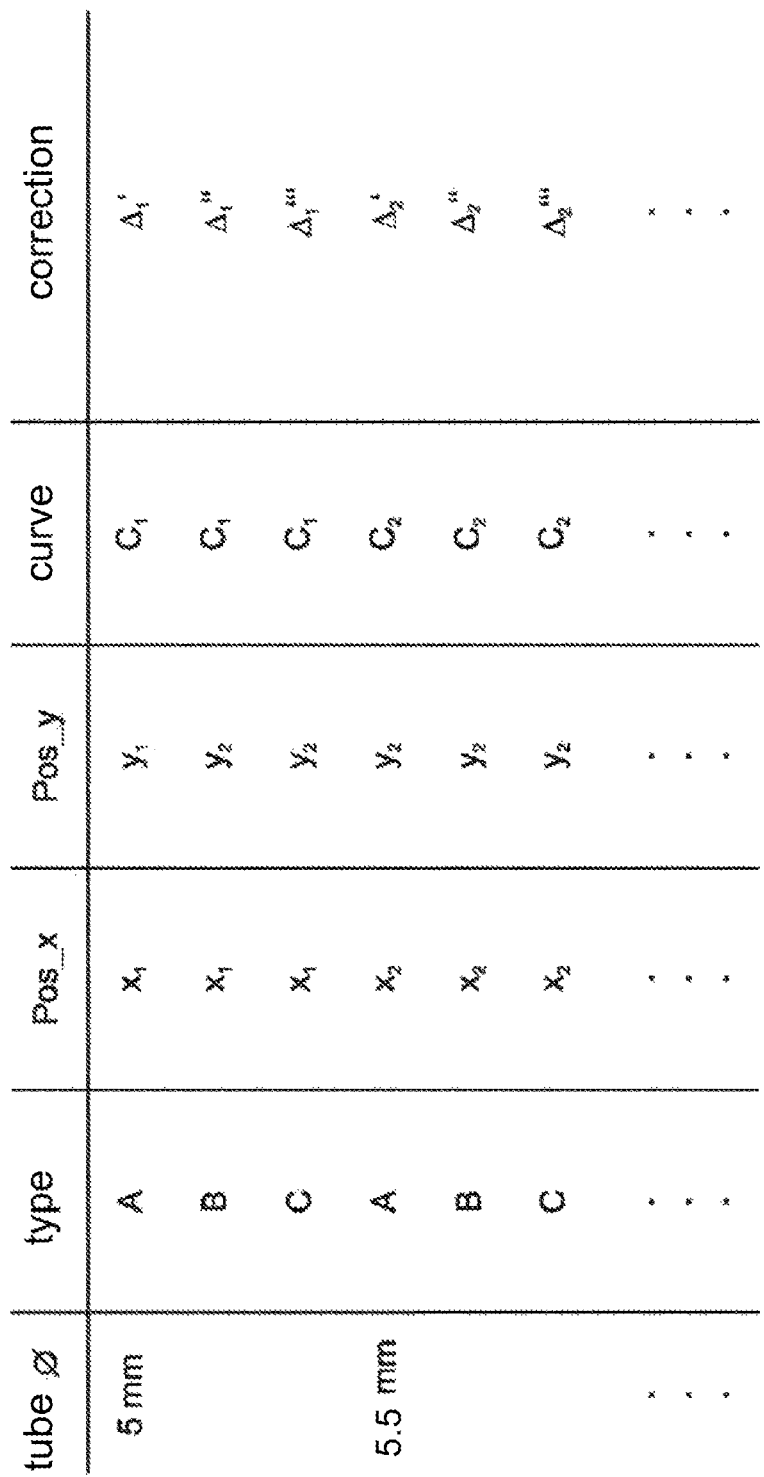
FIG. 4 shows an example for a look-up table for controlling the apparatus of FIG. 1.

According to a further embodiment, the pulling-off trajectory of the pulling device 11 may also be controlled slightly different to the longitudinal axis (y-direction) and/or the movement of the glass tubes 2 in x-direction, so as to selectively affect the shape of the closure at the end of the glass tube and the processing conditions during severing and sealing of the glass tube 2. In particular, different severance and melting conditions may be specified by the controlling device 18 for the same tube diameter according to the type of the glass tube 2 to be sealed, for example depending on the purpose (e.g. for glass ampoules, vials, glass syringe, hollow glass body). This is schematically shown in FIG. 4, which schematically illustrates a look-up table for use by the controlling device.

In the look-up table various additional parameters and control parameters are assigned to each tube diameter, which can further affect the pulling-off trajectory of the pulling device 11. In addition to the type of the glass tube 2 to be sealed, as stated above, for this purpose in particular positions in the two spatial directions transverse to the longitudinal axis or in parallel with the longitudinal axis of the glass tube (x-direction and y-direction) for a starting position of the pulling-off trajectory centered with respect to the glass tube, important parameters C of the pulling-off trajectory itself, such as (also time-dependent) velocities and/or accelerations in the two spatial directions transverse to the longitudinal axis or in parallel with the longitudinal axis of the glass tube (x-direction and y-direction), and correction variables A, which concern a deviation of the pulling-off trajectory from an exactly synchronous movement of the glass tube along the pulling device 11 or from the direction of the longitudinal axis of the glass tube, may be stored. Based on these parameters, the controlling device 18 calculates the pulling-off trajectory to be executed by the pulling device 11. Of course, these parameters and control parameters may also be stored in a memory of the controlling device 18 as a function. This function may also vary in time.

The severed end of the tube is detected by the gripper 12 of the downstream x-y-pulling device 11 and selectively pulled-off. The severance takes place precisely in the region of the softening zone caused by the burner 7. At the same time, the glass tube is sealed by glass which flows in from the softening zone. The advantage of the invention is, in particular, that the pulling-off process takes place within a feed pitch with only one gripper 12 and thus each tube 2 is subjected to identical processing parameters. This is made possible especially by the use of two highly dynamic linear motors in an x-y-configuration, which preferably run exactly in synchronism with the feeding of the conveying device. Or the gripper 12 is automatically centered with respect to the tube 2 by entering the tube diameter, so that changes of the diameter can be handled within the entire range of tubes without changing the gripper. The velocities of the linear motors are freely programmable, so that exactly definable pulling-off trajectories can be specified, i.e. changes of the velocities during the pulling-off process or short holding times. Another special feature is that the tube 2 rotates while the gripped tube end rests. This leads to a slight necking effect, which affects the quality of the generated tube bottom positively and results in a uniform shape of the bottom. At the same time an exact pulling-off in the direction of the tube axis is ensured by means of the gripper.

The advantages of the invention may be summarized in particular as follows: By means of the arrangement as described above, a constant low-abrasion feeding of tubes including a rolling movement can be implemented without a clocking unit. In particular, there are no positioning errors, as these exist with clocked systems. Due to the rolling movement of the tube on the conveying path, simple, linear softening burners below the tubes can be used instead of annular burners. This eliminates the mutual influence of flames such as in the case of annular burners. This results in less burner deterioration caused by exhaust fumes escaping upward. Tolerances within the individual burner nozzles with annular burners conventionally result in non-uniform temperatures above the tube circumference. This problem no longer exists in the configuration according to the present invention with a rotating tube above linear burners. A burner change is not required to adapt to different tube diameters. Due to the fixed distance between the burners and the tube support there is always a constant distance between the burners to the tube. According to the present invention moving burners are not required, which results in a reduction of the risk of accidents by avoiding moving power lines. Overall, this results in a very homogeneous, well-controlled softening zone for a very uniform pulling-off process. According to the present invention only one gripping tong is required, so that identical conditions prevail for each tube. Furthermore, an automatic positioning and centering of tongs in the movement direction is ensured, which is controlled by the tube diameter. A servo-controlled pulling-off speed with a defined speed curve ensures a uniform sealing at the ends of the glass tubes. Further benefits include a reduced thermal input and thus a less emission residues in the tube, the possibility to affect the shape of the bottom, in particular by means of a downstream blowing nozzle, and a modular design with the capability of easy integration into existing lines.

The severance process according to the present invention is capable to flexibly seal glass tubes with different diameters and wall thicknesses and without a change of tools. A preferred application is the sealing of glass tubes in a hot softened state for the production of ampoules, cartridges, syringes or vials for the storage of pharmaceutically active substances.

As will be apparent to a person skilled in the art upon studying the present application, various additional modifications to the above disclosed embodiments may be made without departing from the general approach and scope of the present invention as defined by the appended claims. In particular, the features and aspects of the present invention can be combined in other ways as disclosed above with reference to embodiments.

LIST OF REFERENCE NUMERALS 1 tube end processing device
2 glass tube
3 end portion
4 necking
5 conveying device
6 supporting strip
7 strip of burners
8 heating zone
9 burner
10 flame
11 pulling device
12 gripping device
13 collecting tray
14 motor
15 motor
16 pulling-off trajectory
17 sensor
18 CPU
19 downstream blowing nozzle
20 cooling furnace
30 twisting

What is claimed is:
1. An apparatus for the sealing of glass tubes in a hot softened state, comprising:
a heating device configured for softening an end portion of the glass tube, a conveying device configured for continuously conveying the glass tube along a conveying path and transverse to the longitudinal axis of the glass tube along the heating device, and a pulling device configured for pulling off an end portion of the glass tube softened by the heating device, wherein the conveying device is further configured for rotating the glass tube about its longitudinal axis while it is conveyed along the heating device, and the pulling device is rotationally fixed or rotates at an angular speed which is different to the angular speed of the glass tube, for pulling off the softened end portion from the glass tube in such a manner that the glass tube is sealed by fusion at the severing zone, wherein the conveying device comprises a plurality of contact pins, which contact the glass tube in sections, for pushing the glass tube along the heating device, and at least one stationary supporting strip inclined obliquely upward on which the moving glass tube is supported; wherein the glass tube is put into a rotation about the longitudinal axis by the continuous conveying along the conveying path and by rolling on the inclined supporting strip, to be conveyed transverse to the longitudinal axis along the pulling device in a continuous rolling forward movement, wherein at least one drive is assigned to the pulling device for moving the pulling device transverse to the longitudinal direction in correspondence to the movement of the glass tube while the end portion is pulled off from the severing zone, wherein the respective drive is controlled by a controlling device such that the pulling device is displaced along a pulling-off trajectory corresponding to the movement of the glass tube in the direction of the longitudinal axis and/or transverse to the longitudinal axis.

2. The apparatus according to claim 1, wherein the controlling device controls the pulling-off trajectory as a function of the diameter and/or of the movement of the glass tube transverse to the longitudinal axis and/or of the type of the glass tube to be sealed.

3. The apparatus according to claim 2, further comprising a sensor for detecting the diameter and/or the movement of the glass tube transverse to the longitudinal axis and/or the type of the glass tube to be sealed, so that the controlling device controls the pulling-off trajectory based on the detected diameter and/or on the detected movement of the glass tube transverse to the longitudinal axis and/or on the detected type of the glass tube to be sealed.

4. A method for the sealing of glass tubes in a hot softened state, comprising:

softening the glass tube at a severing zone near an end portion of the glass tube, conveying the glass tube at a predetermined speed transverse to its longitudinal axis along a pulling device, and rotating the glass tube about its longitudinal axis while the end portion is pulled off from the severing zone by means of the pulling device in such a manner that the glass tube is sealed by fusion at the severing zone, wherein the pulling device is rotationally fixed or rotates at an angular speed which is different to the angular speed of the glass tube, and the pulling device is moved in correspondence to the movement of the glass tube transverse to the longitudinal axis while the end portion is pulled off from the severing zone;

wherein the glass tube is put into a rotation about the longitudinal axis by rolling on at least one stationary supporting strip, to be conveyed transverse to the longitudinal axis along the pulling device in a rolling forward movement, wherein at least one drive is assigned to the pulling device for defining a pulling-off trajectory of the pulling device, said method further comprising:

controlling the pulling-off trajectory defined by the at least one drive by means of a controlling device;

detecting the diameter and/or the movement of the glass tube transverse to the longitudinal axis and/or the type of the glass tube to be sealed is detected by a sensor; and controlling the pulling-off trajectory by the controlling device based on the detected diameter and/or on the detected movement of the glass tube transverse to the longitudinal axis and/or on the detected type of the glass tube to be sealed.

5. The method according to claim 4, wherein the supporting strip is inclined obliquely upward.

6. The method according to claim 4, further comprising affecting the shape of a sealed end portion of the glass tube near the severing zone by a blowing nozzle downstream of the pulling device.

* * * * *